United States Patent
Saito et al.

(10) Patent No.: US 9,171,012 B2
(45) Date of Patent: Oct. 27, 2015

(54) FACIAL IMAGE SEARCH SYSTEM AND FACIAL IMAGE SEARCH METHOD

(75) Inventors: Hiroo Saito, Kawasaki (JP); Hiroshi Sukegawa, Yokohama (JP); Osamu Yamaguchi, Yokohama (JP); Toshio Sato, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 841 days.

(21) Appl. No.: 13/419,694

(22) Filed: Mar. 14, 2012

(65) Prior Publication Data

US 2012/0321145 A1 Dec. 20, 2012

(30) Foreign Application Priority Data

Jun. 20, 2011 (JP) ................................ 2011-136355

(51) Int. Cl.
*G06K 9/00* (2006.01)
*G06F 17/30* (2006.01)

(52) U.S. Cl.
CPC ...... *G06F 17/30256* (2013.01); *G06K 9/00255* (2013.01)

(58) Field of Classification Search
None
See application file for complete search history.

(56) References Cited

U.S. PATENT DOCUMENTS

| | | | |
|---|---|---|---|
| 2006/0018522 A1* | 1/2006 | Sunzeri et al. | 382/118 |
| 2008/0092054 A1* | 4/2008 | Bhumkar et al. | 715/739 |
| 2008/0187186 A1* | 8/2008 | Togashi | 382/118 |
| 2008/0300951 A1* | 12/2008 | Kelly | 705/8 |
| 2009/0135269 A1* | 5/2009 | Nozaki et al. | 348/222.1 |
| 2011/0038550 A1* | 2/2011 | Obrador | 382/225 |
| 2011/0128150 A1* | 6/2011 | Kanga et al. | 340/541 |

FOREIGN PATENT DOCUMENTS

| | | |
|---|---|---|
| JP | 2001-209600 A | 8/2001 |
| JP | 2004-328622 A | 11/2004 |
| JP | 2007-190076 A | 8/2007 |
| JP | A-2007-190076 | 8/2007 |
| JP | 2007-243342 A | 9/2007 |
| JP | 2009-088978 A | 4/2009 |
| JP | 2009-246799 A | 10/2009 |
| JP | A-2011-070576 | 4/2011 |
| JP | A-2011-170711 | 9/2011 |
| JP | A-2012-003626 | 1/2012 |
| JP | A-2012-059224 | 3/2012 |
| KR | 1020090093904 A | 9/2009 |

OTHER PUBLICATIONS

Background Art Information Sheet (1 page).

(Continued)

*Primary Examiner* — Sumati Lefkowitz
*Assistant Examiner* — David Perlman
(74) *Attorney, Agent, or Firm* — Posz Law Group, PLC

(57) ABSTRACT

According to one embodiment, a facial image search system including, search module configured to calculate degree of similarity between facial features extracted by feature extraction module and facial features contained in database and output search result based on calculated degree of similarity, measuring module configured to measure amount of search result output by search module, and selection module configured to sort out search result output by search module if amount of search result measured by measuring module is equal to or more than preset threshold.

15 Claims, 6 Drawing Sheets

(56) References Cited

OTHER PUBLICATIONS

Yamaguchi, Osamu et al. "Face Recognition System using Temporal Image Sequence." *The Institute of Electronics, Information and Communication Engineers PRMU.* vol. 197, No. 113 (1997): pp. 17-24.
Office Action mailed Mar. 19, 2013 in corresponding KR patent application No. 10-2012-23338 (and English translation).
Kazuhiro Fukui et al., "Face Recognition System Using Temporal Image Sequence", IEICE Research Report, PRMU, vol. 97, No. 113, pp. 17-24 (1997) (English abstract attached).
Office Action mailed Dec. 9, 2014 issued in corresponding JP patent application No. 2011-136355 (and English translation).

* cited by examiner

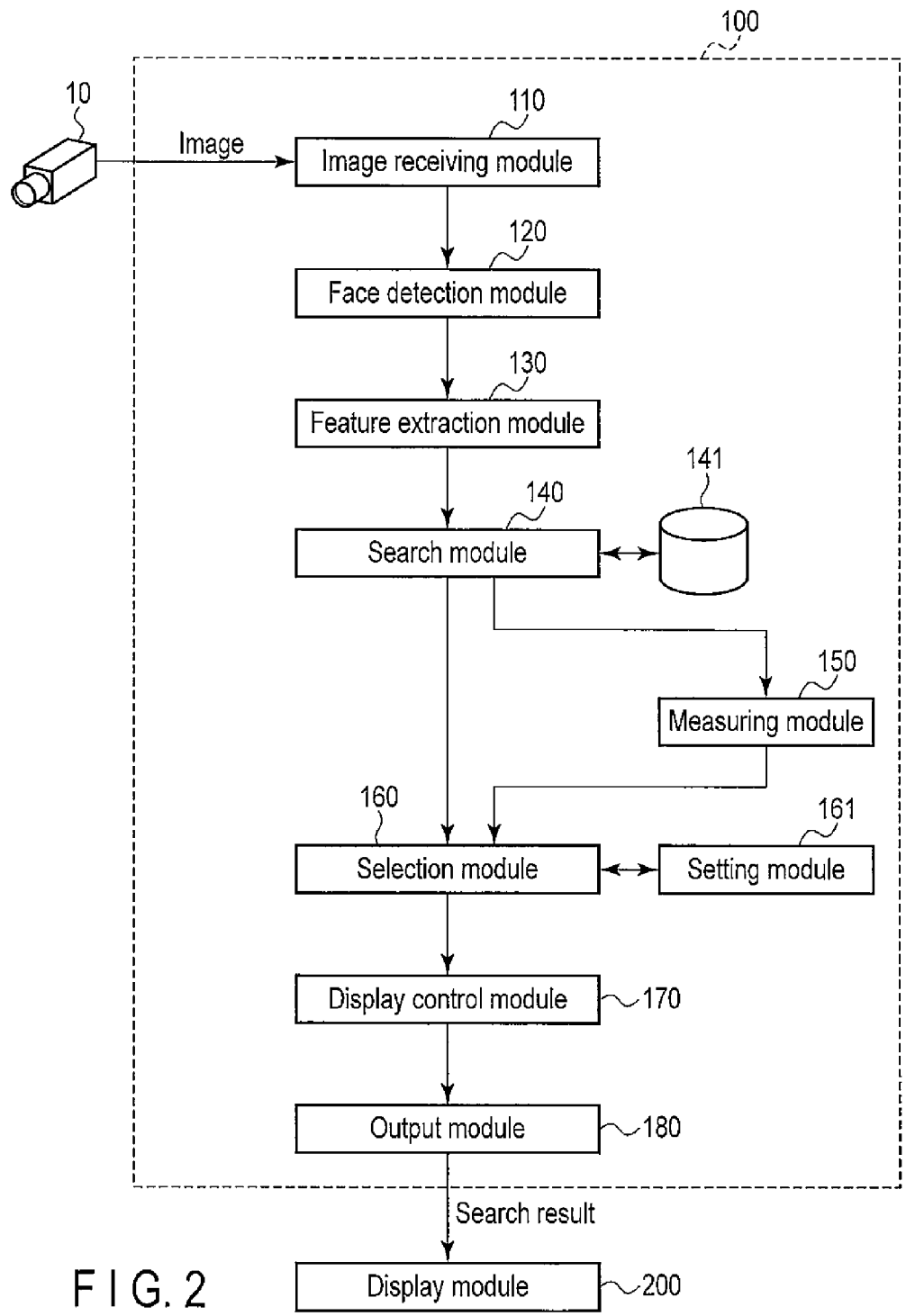
F I G. 2

| Personal ID | Facial image | Facial feature | Flag requiring attention | Attributes ||||| 
| | | | | Age | Sex | Glasses | Mask | Hat |
| --- | --- | --- | --- | --- | --- | --- | --- | --- |
| 0001 | | | ON | Twenties | Man | No | No | Yes |
| 0002 | | | OFF | Thirties | Man | Yes | No | No |
| 0003 | | | OFF | Forties | Woman | No | Yes | No |
| ... | | | | | | | | |

FIG. 3

| Camera | Auto/Manual | Location priority | Date/time priority | Congestion priority | Order of priority |
|---|---|---|---|---|---|
| Collective setting | ☐ Auto | --- | | | ● Descending order  ○ Ascending order |
| Camera 1 | ☐ Auto | 0 | 8:00 to 9:00 | ■ Yes | ● Descending order  ○ Ascending order |
| Camera 2 | ■ Auto | | 7:00 to 15:00 | ■ Yes | ● Descending order  ○ Ascending order |
| Camera 3 | ☐ Auto | ■ Auto | Month**Day*Year*** | | ● Descending order  ○ Ascending order |
| Camera 4 | ☐ Auto | 100 | Every Wednesday | ☐ Yes | ● Descending order  ○ Ascending order |
| Camera 5 | ■ Auto | ■ Auto | | ☐ Yes | ● Descending order  ○ Ascending order |
| ⋮ | ⋮ | ⋮ | ⋮ | ⋮ | ⋮ |

F I G. 4

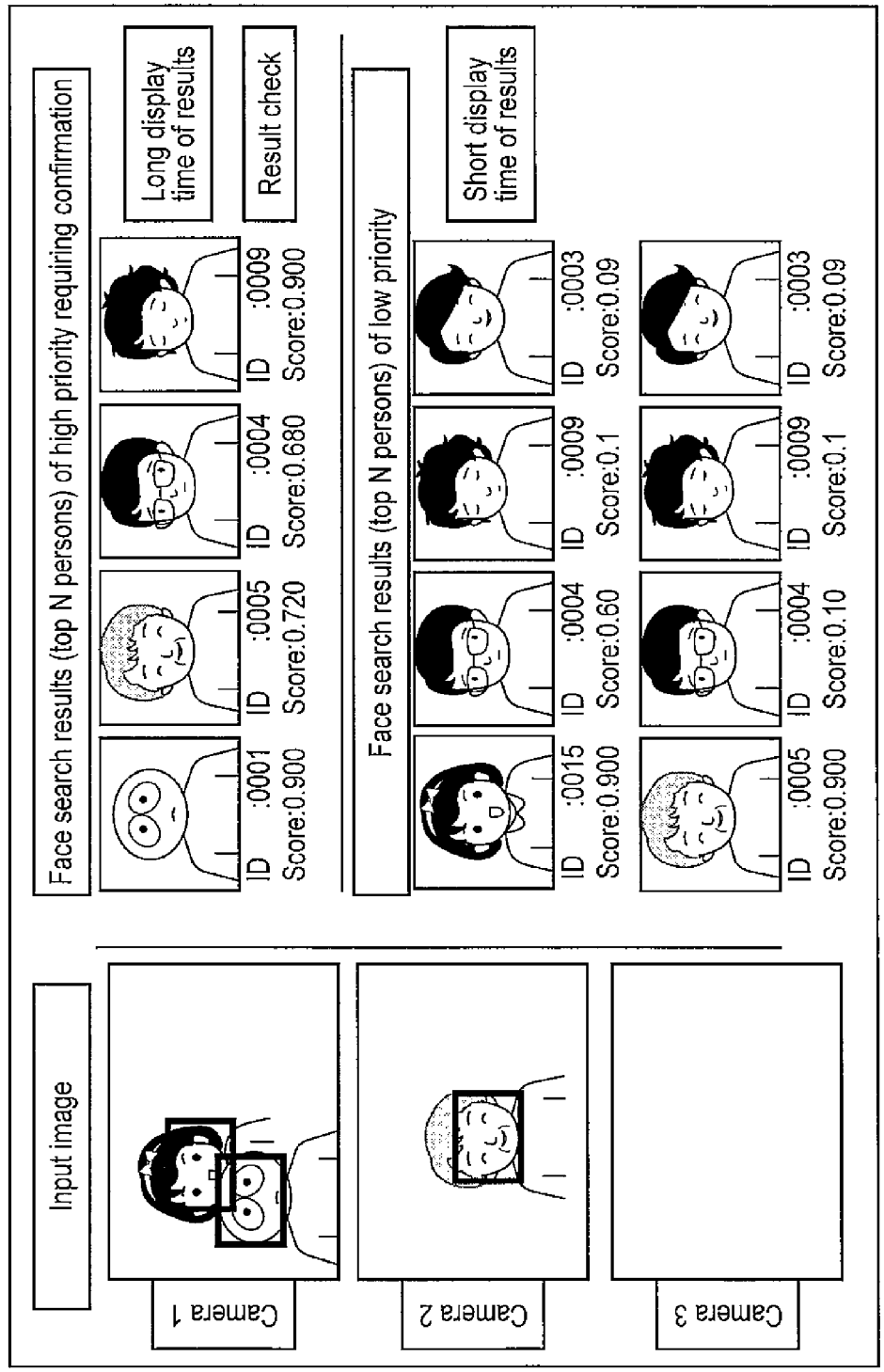
F I G. 5

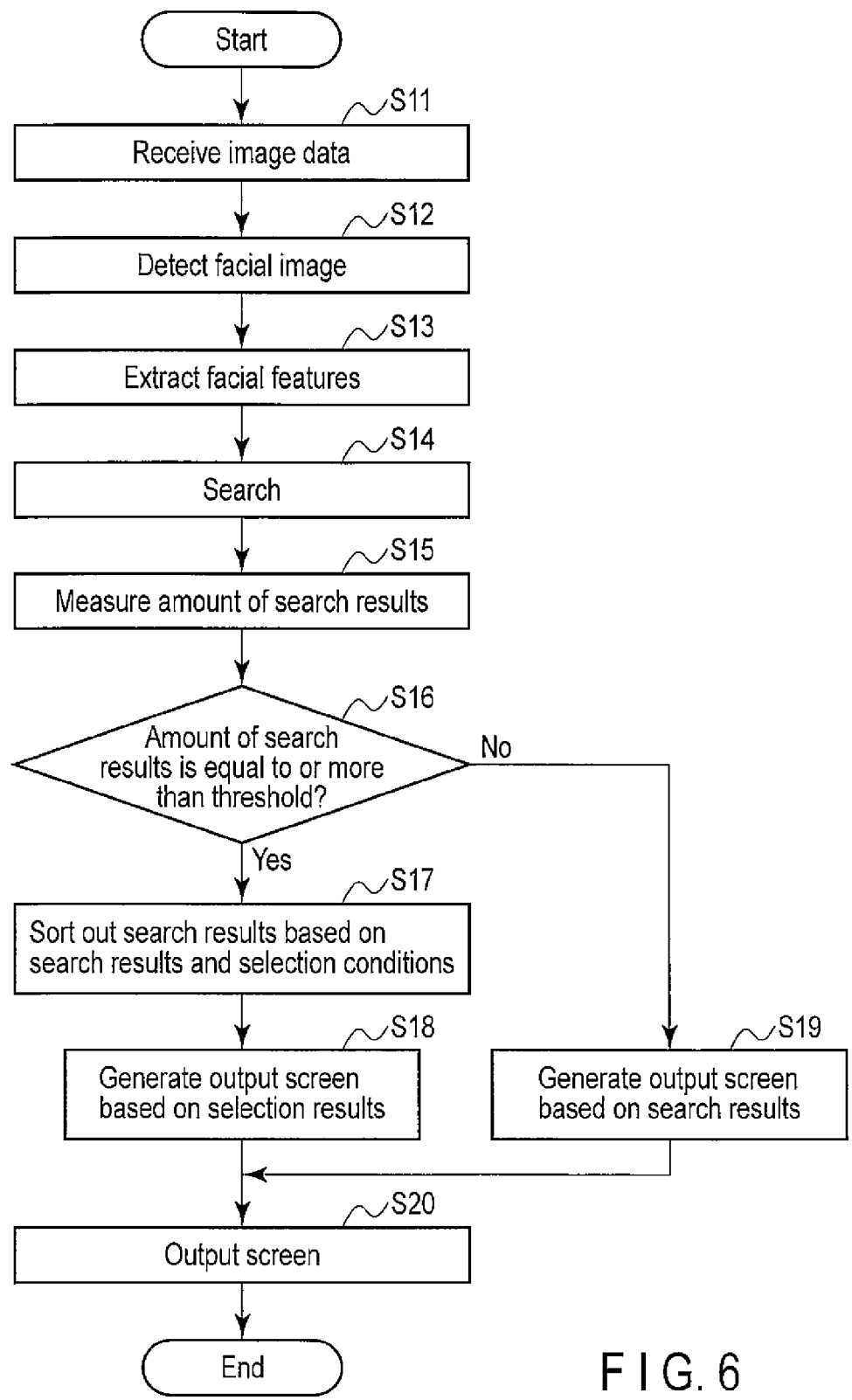
F I G. 6

FACIAL IMAGE SEARCH SYSTEM AND FACIAL IMAGE SEARCH METHOD

CROSS-REFERENCE TO RELATED APPLICATIONS

This application is based upon and claims the benefit of priority from prior Japanese Patent Application No. 2011-136355, filed Jun. 20, 2011, the entire contents of which are incorporated herein by reference.

FIELD

Embodiments described herein relate generally to a facial image search system and a facial image search method.

BACKGROUND

A facial image search system that detects a facial image from images acquired by a plurality of cameras installed at a plurality of locations and searches a database for the facial image is known. The facial image search system also detects a facial image from images acquired by a camera or images stored in a recording apparatus and stores the facial image in a database.

If the number of cameras supplying facial images to the facial image search system or the amount of information in a database of the facial image search system increases, search results output by the facial image search system increase. Thus, the burden on an administrator of the facial image search system may grow. Accordingly, a problem that confirmation work by the administrator of the facial image search system may not be in time is posed.

BRIEF DESCRIPTION OF THE DRAWINGS

FIG. 2 is an exemplary view showing for explaining the facial image search system according to the embodiment;

FIG. 3 is an exemplary view showing for explaining the facial image search system according to the embodiment;

FIG. 4 is an exemplary view showing for explaining the facial image search system according to the embodiment;

FIG. 5 is an exemplary view showing for explaining the facial image search system according to the embodiment; and FIG. 6 is an exemplary view showing for explaining the facial image search system according to the embodiment.

DETAILED DESCRIPTION

Figure 1:
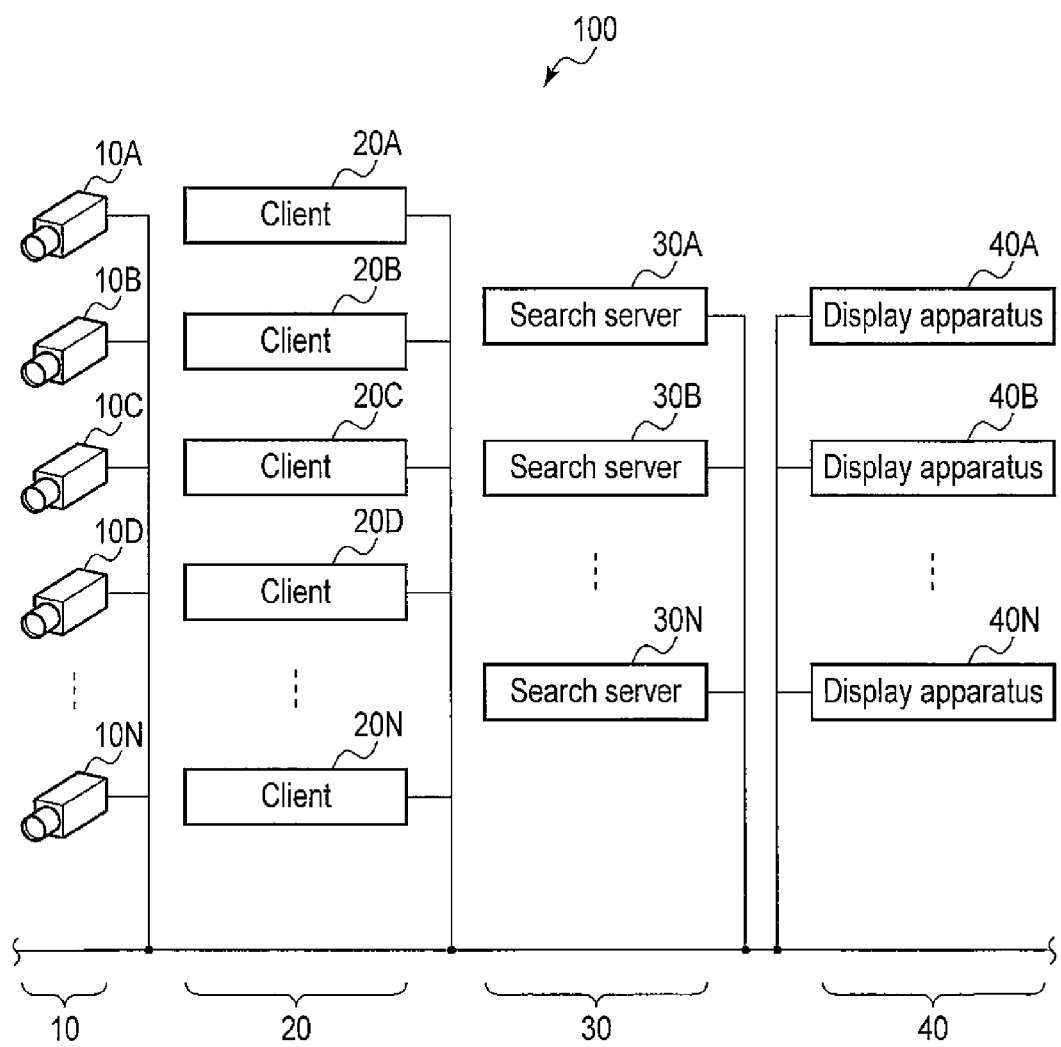
FIG. 1 is an exemplary view showing for explaining a facial image search system according to an embodiment.

In general, according to one embodiment, a facial image search system, including, a storage module configured to store a plurality of facial features as a database in advance, an image receiving module configured to receive image data, a face detection module configured to detect a facial image from the image data received by the image receiving module, a feature extraction module configured to extract the facial features from the facial image detected by the face detection module, a search module configured to calculate a degree of similarity between the facial features extracted by the feature extraction module and the facial features contained in the database and output a search result based on the calculated degree of similarity, a measuring module configured to measure an amount of the search result output by the search module, a selection module configured to sort out the search result output by the search module if the amount of the search result measured by the measuring module is equal to or more than a preset threshold, a display control module configured to generate a search result screen based on the search result sorted by the selection module; and an output module configured to output the search result screen generated by the display control module.

A facial image search system and a facial image search method according to an embodiment will be described below with reference to drawings.

FIG. 1 shows an example of a facial image search system 100 according to an embodiment.

The facial image search system 100 includes a camera 10 that acquires an image, a client 20, a search server 30, and a display apparatus 40. In FIG. 1, an example in which the facial image search system 100 includes a plurality of cameras 10A to 10N, a plurality of clients 20A to 20N, a plurality of search servers 30a to 30N, and a plurality of display apparatuses 40A to 40N is shown.

The camera 10, the client 20, the search server 30, and the display apparatus 40 are mutually connected by a LAN, public line, or another network capable of performing data communication. Accordingly, the camera 10, the client 20, the search server 30, and the display apparatus 40 can mutually perform data communication.

The camera 10 receives light from a predetermined range to acquire an image. For example, the cameras 10A to 10N are installed in mutually different locations. Accordingly, the camera 10 can acquire an image of persons present in each location. The camera 10 includes, for example, an industrial television (ITV) camera. The ITV camera generates an electric signal based on light received by a lens and digitizes the electric signal by an analog/digital (A/D) converter for output as image data. Accordingly, the camera 10 can output image data to the client 20.

The client 20 detects a facial image (facial image data) based on image data output from the camera 10. The method of detecting a facial image will be described later.

Further, the client 20 extracts facial features of persons based on detected facial image data. Further, the client 20 discriminates attributes of a person based on facial image data or facial features. The client 20 generates attribute information indicating attributes based on discriminated attributes. The client 20 outputs facial image data, facial features, and attribute information as one piece of personal data.

The search server 30 stores personal information output from the client 20. The search server 30 constructs a database containing a plurality of pieces of personal information. Further, the search server 30 performs a personal search by calculating a degree of similarity between facial features contained in personal information registered with the database and facial features contained in personal information output from the client 20. The search server 30 can notify the administrator of the facial image search system 100 of past access of a specific person by, for example, displaying search results in the display apparatus 40.

Accordingly, the facial image search system 100 can identify personal information in the database by using facial images. As a result, the facial image search system 100 can realize, for example, a search for a specific person from customer data or a search for an appropriate person from a database of suspicious persons. The facial image search system 100 can also be used for personal identification when an ID certificate is updated or prevention of double issuance when an ID certificate is newly issued.

FIG. 2 shows a concrete example of the facial image search system 100 according to an embodiment. FIG. 2 shows each function of the facial image search system 100 as a block.

As shown in FIG. 2, the facial image search system 100 includes an image receiving module 110, a face detection module 120, a feature extraction module 130, a search module 140, a personal information storage module 141, a measuring module 150, a selection module 160, a display control module 170, and an output module 180.

The image receiving module 110, the face detection module 120, and the feature extraction module 130 are included in the client 20 shown, for example, in FIG. 1. A still another module connected to the network shown in FIG. 1 may be configured to include the above functional blocks. The facial image search system 100 may be configured to include a plurality of blocks of each of the above blocks. That is, the number of each block of the facial image search system 100 can optionally be increased in accordance with numbers of inputs/outputs of the facial image search system 100.

The image receiving module 110 receives image data from the camera 10. The image receiving module 110 transmits the received image data to the face detection module 120. The image receiving module 110 may also be configured to receive image data recorded in a storage apparatus that records video such as a digital video recorder (DVR) or a memory, instead of the camera 10. Further, the image receiving module 110 may also be configured to receive an analog video signal (image), make an analog/digital conversion of the received analog video signal, and transmit the converted digital image data to the face detection module 120.

The face detection module 120 detects an image (facial image) of a region (face region) in which any face of a person appears based on image data transmitted from the image receiving module 110. The face detection module 120 transmits the detected facial image to the feature extraction module 130.

For example, the face detection module 120 calculates a correlation value while moving a template prepared in advance in image data. The face detection module 120 identifies the region where the highest correlation value is calculated as a face region. Accordingly, the face detection module 120 can detect a facial image of a face region where the face of a person appears in image data.

The face detection module 120 may also be configured to detect a face region by using eigen space method or subspace method. The face detection module 120 may also be configured to detect a face region by detecting positions of face portions such as the eyes and nose from image data.

When one face region (facial features) is detected from one image, the face detection module 120 outputs the position where the correlation value with a template is the largest for the whole image and the size thereof. When a plurality of facial features is detected from one image, the face detection module 120 determines local maximum values of the correlation value for the whole image and narrows down candidate positions of the face by considering overlapping within one image. Further, the face detection module 120 can detect a plurality of facial images simultaneously in the end by considering the relationship (time shift) with past images input continuously.

In addition, the face detection module 120 may be configured to store face patterns when a person puts on a mask, sun glasses, a hat or the like as templates in advance so that a face region can be detected even when the person puts on a mask, sun glasses, a hat or the like.

If all feature points of a face cannot be detected when detecting feature points of the face, the face detection module 120 performs processing based on the evaluation point of a portion of facial feature points. That is, if the evaluation point of a portion of facial feature points is equal to or larger than a preset standard value, the face detection module 120 can estimate remaining feature points from feature points detected by using a two-dimensional plane or a three-dimensional face model.

If no feature point is detected, the face detection module 120 detects the position of a whole face by learning patterns of the whole face in advance to estimate facial feature points from the position of the whole face.

If the camera 10 is surveillance camera, the same person is likely to appear in successive frames. Thus, the face detection module 120 calculates the probabilities of movement in successive frames when a person normally walks based on statistical information and selects a combination of the highest probability so that face regions detected successively can be associated. Accordingly, the face detection module 120 can detect one face region from a scene in which the same person appears in a plurality of frames.

If the frame rate of the camera 10 is high, the face detection module 120 can detect one face region from a scene in which the same person appears in a plurality of frames by associating face regions between frames by using an optical flow or the like.

The face detection module 120 may also be configured to detect, for example, a whole body of a person. The face detection module 120 determines, for example, what the distribution of luminance slope information looks like when a person is present by using coincidence in a plurality of local regions. If a person is present, the face detection module 120 calculates the region where the person appears as rectangular information. Based on the detection result, the face detection module 120 estimates the face region where the face of the person appears to detect a facial image. Based on the rectangular information, the face detection module 120 may also be configured to measure the height of a person.

Based on the facial image transmitted from the face detection module 120, the feature extraction module 130 extracts facial features. Facial features are feature information to identify individuals. The feature extraction module 130 can calculate facial features by using, for example, the subspace method. The feature extraction module 130 transmits extracted facial features to the search module 140.

The feature extraction module 130 extracts, for example, a grayscale image of a facial image as facial features. The feature extraction module 130 extracts grayscale values of a region of m pixels×n pixels as a (m×n)-dimensional feature vector. That is, the feature extraction module 130 normalizes the length of each of a vector and another vector to 1 by using the technique called the simple similarity degree method and calculates an inner product of the vectors. Accordingly, the feature extraction module 130 can calculates the degree of similarity indicating similarities between feature vectors.

The feature extraction module 130 can also create images in which the orientation and state of a face are intentionally varied by using a model preset for a facial image to extract facial features based on the above images.

Further, as described above, the feature extraction module 130 can extract facial features with higher precision based on a plurality of facial images captured successively by the camera 10. The feature extraction module 130 uses, for example, the literature (IEICE Research Report "Facial Recognition System Using Dynamic Images" by Kazuhiro Fukui, Osamu Yamaguchi, and Kenichi Maeda, PRMU, vol 97, No. 113, pp 17-24 (1997)). In this case, the feature extraction module 130 can extract facial features by using, for example, the mutual subspace method. That is, the feature extraction module 130 calculates a correlation matrix of a feature vector of a facial image and determines an eigen vector by the KL expansion of the calculated matrix. Accordingly, the feature extraction module 130 calculates a subspace indicating features of a face obtained from successive images.

The subspace can be represented by a set of k eigen vectors selected in descending order of magnitude of the eigen value. In the present embodiment, an eigen value matrix Φ is calculated by calculating a correlation matrix Cd from a feature vector and diagonalizing the correlation matrix Cd like Cd=Φd×Δd×Φd×T.

Further, the feature extraction module 130 discriminates attributes of a person based on facial image data or facial features. The feature extraction module 130 generates attribute information indicating attributes based on discriminated attributes. The feature extraction module 130 outputs facial image data, facial features, and attribute information to the search module 140 as one piece of personal information.

The feature extraction module 130 discriminates attributes, for example, the "age", "sex", "glasses", "hat", and "mask". The feature extraction module 130 may be configured to discriminate still other attributes. Examples of other attributes include, for example, clothes, facial expressions, obesity index, degree of affluence, ornaments on the face, and human race.

If, for example, attributes such as the age and sex are discriminated, the feature extraction module 130 can discriminate attributes with high precision by performing preprocessing appropriate for each of the age and sex.

Normally, a person's face become more wrinkled with advancing age. Thus, the feature extraction module 130 can discriminate the age of person by, for example, superimposing a line highlighting filter highlighting wrinkles on facial features.

The feature extraction module 130 also superimposes a filter that highlights frequency components highlighting sex-specific portions (for example, whiskers) or a filter that highlights skeleton information on facial features. Accordingly, the feature extraction module 130 can discriminate the sex of a person.

If, for example, the sex is discriminated, the feature extraction module 130 calculates one value indicating the degree of sex as a discrimination result. The feature extraction module 130 discriminates between man and woman based on the value and a preset standard value. However, if a value close to the standard value is calculated, the feature extraction module 130 makes no discrimination between man and woman.

The feature extraction module 130 identifies the position of the eye, corner of the eye, or eye's inner corner from position information of face portions determined by, for example, face detection processing. Accordingly, the feature extraction module 130 can determine whether a person is bespectacled by cutting out an image near both eyes and setting the cut-out image for calculation of subspace.

The feature extraction module 130 also identifies the positions of the mouth and nose from position information of face portions determined by, for example, face detection processing. Accordingly, the feature extraction module 130 can determine whether a person wears a mask by cutting out an image in positions of the identified mouth and nose and setting the cut-out image for calculation of subspace.

The feature extraction module 130 also identifies the positions of the eye and brow from position information of face portions determined by, for example, face detection processing. Accordingly, the feature extraction module 130 can identify the upper end of a skin region of face. Further, the feature extraction module 130 can determine whether a person wears a hat by cutting out an image of a head region of the identified face and setting the cut-out image for calculation of subspace.

As described above, the feature extraction module 130 can discriminate attributes such as the age, sex, glasses, mask, and hat based on facial features or a facial image. That is, the feature extraction module 130 can extract feature information of any attribute present in a position that can be estimated from the position of a face.

Moreover, algorithms that directly detect worn matter worn by a person are generally in practical use. The feature extraction module 130 may be configured to discriminate attributes by using such techniques. For example, the feature extraction module 130 may be configured to further discriminate the type of glasses, type of mask, type of hat, whiskers, moles, wrinkles, injury, hairstyle, color of hair, color of clothes, style of clothes, hat, ornaments, worn matter close to the face, facial expressions, degree of affluence, and human race.

The search module 140 and the personal information storage module 141 are units included in the search server 30 shown in FIG. 1. However, the personal information storage module 141 and the search module 140 may be modules configured separately. The number of the personal information storage module 141 and the search modules 140 installed in the facial image search system 100 may be any number.

The personal information storage module 141 is a memory that stores personal information transmitted from the feature extraction module 130. As shown, for example, in FIG. 3, the personal information storage module 141 stores a plurality of pieces of personal information as a database. The personal information storage module 141 stores each individual by associating with, for example, facial features, facial images, a flag requiring attention, and attributes.

The flag requiring attention is a flag indicating whether the person is a person who should be particularly preferentially identified. The flag requiring attention is set by any operation input.

As described above, attributes include, for example, the sex, age, height, hat, mask, glasses and the like. Facial features stored in the personal information storage module 141 are data extracted by, for example, the feature extraction module 130. That is, the personal information storage module 141 stores one or a plurality of an (m×n)-dimensional feature vector, subspace, and correlation matrix immediately before KL expansion.

In the present embodiment, an example in which the personal information storage module 141 and the search module 140 are in a one-to-one correspondence is shown. However, the facial image search system 100 may have a configuration in which the personal information storage module 141 and the search modules 140 are in a one-to-many correspondence. Alternatively, the facial image search system 100 may have a configuration in which the personal information storage modules 141 and the search module 140 are in a many-to-one correspondence. The personal information storage module 141 may be configured to classify and store information by attribute.

The search module 140 calculates the degree of similarity between facial features contained in personal information transmitted from the feature extraction module 130 and facial features contained in personal information stored in the personal information storage module 141. For example, the search module 140 calculates the degree of similarity between facial features contained in personal information transmitted from the feature extraction module 130 and facial features contained in a plurality of pieces of personal information stored in the personal information storage module 141 and searches the personal information storage module 141 for personal information with a high degree of calculated similarity. The search module 140 transmits search results to the selection module 160.

The search module 140 calculates, for example, the degree of similarity of subspace as a facial feature. As the calculation method thereof, the subspace method, combined similarity degree method or the like may be used. By using the methods, the search module 140 calculates an "angle" formed by subspace of personal information in a database stored in the personal information storage module 141 in advance with subspace calculated by the feature extraction module 130 as the degree of similarity. The search module 140 calculates a correlation matrix Cin for an input data sequence.

The search module 140 calculates an eigen vector Φin by diagonalization like Cin=ΦinΔinΦinT. The search module 140 calculates the degree of similarity between subspaces (0.0 to 1.0) of subspaces denoted by Φin and Φd and uses the degree of similarity between subspaces as the degree of similarity.

The measuring module 150 measures the amount of search processing of facial images detected from image data and the burden on the administrator of the facial image search system 100.

The measuring module 150 measures the amount of search results based on indexes such as the detection number of face per unit time, number of search queries per unit time, number of search results per unit time, number of search results exceeding a predetermined threshold per unit time, CPU load of devices in the facial image search system 100, amount of used memory, and amount of network traffic.

The measuring module 150 measures the amount of search results based on a function quoting one or a plurality of the detection number of face per unit time, number of search queries per unit time, number of search results per unit time, number of search results exceeding a predetermined threshold per unit time, CPU load of devices in the facial image search system 100, amount of used memory, and amount of network traffic.

If the amount of search results exceeds a preset threshold, the measuring module 150 transmits an alert to the selection module 160. The threshold may also be an optionally set value. Alternatively, the threshold may be a value set every hour, every day of the week, every day of the month, or every month.

Further, the facial image search system 100 may be further configured to vary the above threshold based on the number of administrators of the facial image search system 100, whether an operation is input in accordance with search results displayed in the display apparatus 40, or the time needed to input the operation. Accordingly, the facial image search system 100 can measure efficiency of confirmation work of the administrator and make a display suitable for the efficiency.

The selection module 160 and a setting module 161 are units included in the search server 30 shown, for example, in FIG. 1. However, the selection module 160 and the setting module 161 may be modules configured separately.

The setting module 161 generates and stores selection conditions used for selection processing by the selection module 160. The setting module 161 has an operation module that generates an operation signal based on operation input by the administrator of the facial image search system 100 and a display module that displays a setting screen and the like connected thereto. The setting module 161 generates a setting screen to cause the display module to display the setting screen. FIG. 4 shows an example of the setting screen generated by the setting module 161.

The setting screen includes items such as "Camera", "Auto/Manual (Auto or Manual)", "Location Priority", "Date/Time Priority", "Congestion Priority", and "Order of Priorities". Based on these settings, the facial image search system 100 sorts out search results searched by the search module 140.

"Camera" is an item indicating the camera 10 to be set. That is, setting items shown in FIG. 3 may have, for example, a configuration set for each of the cameras 10 shown in FIG. 1. Alternatively, setting items may have a configuration set (set collectively) for all the cameras 10 shown in FIG. 1.

"Auto/Manual" is an item to set whether or not to generate selection conditions automatically. If "Auto" is selected, the setting module 161 automatically generates selection conditions. For example, the setting module 161 automatically generates selection conditions based on the hit count of past search results or a history of occurrence of important events.

If "Manual" is selected, the setting module 161 generates selection conditions based on the items of "Location Priority", "Date/Time Priority", "Congestion Priority", and "Order of Priorities" and the operation input.

"Location Priority" shows a score set based on the location where the camera 10 is installed. Accordingly, the facial image search system 100 can set priority to locations of high security level, for example, in the vicinity of a safe.

"Date/Time Priority" is a score set based on the date/time when image data is acquired. Accordingly, the facial image search system 100 can set priority to persons detected in the time in which guarding is needed such as dates and opening time of specific events and the midnight.

"Congestion Priority" is a score set based on the degree of congestion of the location where the camera 10 is installed. Accordingly, the facial image search system 100 can cause the display module to preferentially display search results based on image data acquired in locations with a high degree of congestion such as an entrance.

The facial image search system 100 can automatically calculate the degree of congestion for each of the cameras 10. For example, the facial image search system 100 calculates a score based on the number of facial images detected by the face detection module 120.

"Order of Priority" is an item indicating which of search results of low priority and search results of high priority to preferentially display in selection processing. If, for example, priority should be given to search results of high priority, as described above, the facial image search system 100 preferentially displays search results based on image data acquired in locations of high security level, in the time when guarding is needed, or in congested locations.

If priority should be given to search results of low priority, the facial image search system 100 can preferentially display search results based on image data acquired in location with a low degree of congestion. Accordingly, the facial image search system 100 can detect an entry of a person into a location which is normally not visited by anyone.

The selection module 160 performs selection processing based on a plurality of search results transmitted from the search module 140 and selection conditions stored in the setting module 161 and outputs the result of the selection processing to the display control module 170.

When an alert is received from the measuring module 150, the selection module 160 performs selection processing. In such a case, the selection module 160 calculates the priority for each search result. The selection module 160 sorts out search results based on the size of the calculated priority and the preset number of display items. The selection module 160 transmits the sorted search result and priority to the display control module 170 as a selection result.

The selection module 160 individually calculates the priority based on the search result and selection conditions. The priority may be, for example, a mark ranging from 0 to 100 or a probability value.

The selection module 160 focuses on one of items of selection conditions, for example, in accordance with search results to calculate a score and calculates the priority based on the calculated score. That is, the selection module 160 calculates a score for each search result based on one of, for example, "Location Priority", "Date/Time Priority", and "Congestion Priority" and calculates the priority based on the calculated score.

The selection module 160 may also be configured to calculate a score for each item of selection conditions, for example, in accordance with search results and to calculate the priority by integrating calculated scores.

Further, the selection module 160 may also be configured to calculate a score for each item of selection conditions in accordance with search results and to calculate a vector distance based on a plurality of calculated scores to use the calculated vector distance as the priority.

If, for example, image data is acquired from the N cameras 10, the selection module 160 sets a vector or scalars of n_k scores calculated based on search results based on image data received from the camera k (k=1, 2, . . . , N) as p(1, k), . . . , p(n_k, k). In this case, the selection module 160 calculates the priority based on, for example, $$\max\{p(i, n\_k) | k=1, 2, \ldots, N, i=1, 2, \ldots, n\_k\}.$$

The selection module 160 may also be configured to preferentially display search results of persons whose flag requiring attention is ON, for example, in a database stored in the personal information storage module 141. If, for example, the flag requiring attention is ON in a search result received from the search module 140, the selection module 160 can add a predetermined score or priority. Accordingly, the facial image search system 100 can cause the display module to preferentially display search results related to predetermined persons.

The selection module 160 may be configured to preferentially display search results when abnormal behavior is detected based on image data received from the camera 10. For example, the facial image search system 100 detects abnormal behavior based on changes over time of a person appearing in image data successively received from the camera 10. For example, the facial image search system 100 detects abnormal behavior based on the movement distance of a face region of some person in successive frames. If, for example, abnormal behavior is detected in a search result received from the detection unit 140, the selection module 160 can add a predetermined score or priority. Accordingly, the facial image search system 100 can cause the display module to preferentially display search results related to a person exhibiting abnormal behavior.

As described above, the selection module 160 calculates a score based on the location where image data is acquired, the time when image data is acquired, the degree of congestion of the location where image data is acquired, absence/presence of abnormal behavior when image data is acquired, and absence/presence of the flag requiring attention in search results. The selection module 160 may also be configured to calculate a score based on one or a plurality of the age, sex, human race, and various attributes in search results.

The display control module 170 determines the timing to display and erase search results based on a selection result received from the selection module 160. Further, the display control module 170 generates and outputs a sequential search result screen to the output module 180. The display control module 170 calculates the time to display search results based on, for example, the priority and generates a search result screen based on the calculated result.

For example, the display control module 170 sets M search results in descending order of priority as r_1, . . . , r_M. Further, the display control module 170 sets t_1, . . . , t_M in such a way that the display time of each search result increases with an increasing level of priority. Further, the display control module 170 can set the display time of each search result longer than a preset predetermined time T. The display control module 170 may also be configured to control the display time by controlling the auto scroll speed.

Further, the display control module 170 may also be configured so that the end of display of search results is judged based on confirmation work of the administrator. That is, if search results whose priority is equal to or higher than a predetermined value should be displayed, the display control module 170 may be configured to display the above search results until a predetermined operation input by the administrator is done. That is, the display control module 170 may be configured to generate a search result screen so as to cause the search result screen to display search results until a predetermined operation signal from an operation module (not shown) is received.

For example, the display control module 170 generates the search result screen shown in FIG. 5. As shown in FIG. 5, the search result screen displays input images (image data), images of similar face candidates, and face search results.

In input images, image data received from each of the cameras 10 is chronologically scrolled. Search results displayed as similar face candidates are search results based on input images in the top portion.

Similar face candidates are search results sorted by, for example, the above selection processing. In FIG. 5, N search results of high priority are displayed. That is, search results displayed as similar face candidates are search results of high priority.

Face search results are, for example, search results not sorted by the above selection processing. In FIG. 5, N search results not sorted by selection processing are displayed. For example, the display control module 170 generates a search result screen so that similar face candidates are displayed longer than face search results.

The display control module 170 may display the calculated degree of similarity and ID near images of similar face candidates and face search results. The display control module 170 may also display the photographing location and date/time near input images.

The display control module 170 may also display a region in which a facial image is detected by the face detection module 120 by enclosing the region with a rectangular frame. Accordingly, the display control module 170 can signal a detected face region to the administrator of the facial image search system 100.

The number of similar face candidates displayed in the search result screen can be set to any number. The facial image search system 100 may be configured to signal to the administrator of the facial image search system 100 by using sound of alarm or the like when the degree of similarity equal to or larger than a preset threshold.

The output module 180 outputs the search result screen generated by the display control module 170 to a display module 200.

The display module 200 includes a display apparatus that displays a screen of video or the like. The display module 200 is connected to the network shown in FIG. 1 and receives and displays a screen output from the output module 180. The number of the display modules 200 may be more than one. In such a case, the output module 180 outputs the search result screen to the desired display module 200.

FIG. 6 shows an example of processing performed by the facial image search system 100.

The image receiving module 110 receives image data from the camera 10 (step S11). The image receiving module 110 transmits the received image data to the face detection module 120.

The face detection module 120 detects a face (facial image) based on image data transmitted from the image receiving module 110 (step S12). The face detection module 120 transmits the detected facial image to the feature extraction module 130.

Based on the facial image transmitted from the face detection module 120, the feature extraction module 130 extracts facial features (step S13). Further, the feature extraction module 130 may discriminate attributes based on the extracted facial features or facial image.

The search module 140 performs a search based on the extracted facial features and personal information stored in the personal information storage module 141 (step S14). That is, the search module 140 calculates the degree of similarity between the extracted facial features and facial features contained in personal information stored in the personal information storage module 141.

Further, the measuring module 150 measures the amount of search results (step S15). The measuring module 150 determines whether the amount of measured search results is equal to or more than a preset threshold (step S16).

If the amount of measured search results is equal to or more than the preset threshold, the selection module 160 sorts out search results based on the search result acquired by the search module and the preset selection conditions. For example, the selection module 160 calculates the priority for each search result and outputs top N search results of priority as a selection result.

The display control module 170 generates a search result screen based on the selection result (step S18). For example, the display control module 170 calculates a display time to display each search result based on the calculated priority and generates a search result screen based on the display time and search results.

If the amount of measured search results is less than the preset threshold, the selection module 160 does not perform selection processing. In this case, the display control module 170 generates a search result screen based on search results acquired by the search module 140 (step S19).

The display control module 170 transmits the generated search result screen to the output module 180. In this case, the output module 180 outputs the search result screen received from the display control module 170 to the display module 200 (step S20). Accordingly, the facial image search system 100 can sequentially signal a search result to the administrator of the facial image search system 100. Further, the facial image search system 100 can display a search result for which a high priority is calculated for a longer time and a search result for which a low priority is calculated for a shorter time. That is, the facial image search system 100 can control the display time of search results in accordance with the calculated priority.

The search module 140 may be configured to perform a search by narrowing down the database in accordance with attributes judged from a facial images or the like. That is, the personal information storage module 141 adds attribute information, ID of the camera that has acquired an image of personal information, and acquisition date/time of the image to the personal information of the database. In this case, the search module 140 can narrow down search targets based on the photographing location, date/time, or attributes of the image data.

As described above, the facial image search system 100 according to the present embodiment detects facial images and facial features from image data and searches the database containing a plurality of pieces of personal information based on facial features. Further, the facial image search system 100 measures the amount of search results and if the amount of search results is equal to or more than a preset threshold, calculates the priority for each search result and sorts out search results in accordance with the calculated priority. The facial image search system 100 generates a search result screen and causes the display module to display the search result screen in accordance with the sorted search results and priorities.

With the above configuration, the facial image search system 100 can sort out and cause the display module to display search results based on preset conditions. The facial image search system 100 can also can reliably cause the administrator to check search results of high priority by controlling the display time of search results in accordance with the priority. As a result, a facial image search system capable of efficiently performing a search of facial images and a facial image search method can be provided.

Functions described in the above embodiment may be constituted not only with use of hardware but also with use of software, for example, by making a computer read a program which describes the functions. Alternatively, the functions each may be constituted by appropriately selecting either software or hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A facial image search system, comprising:
a storage module configured to store a plurality of facial features as a database in advance;
an image receiving module configured to receive image data;
a face detection module configured to detect a facial image from the image data received by the image receiving module;
a feature extraction module configured to extract the facial features from the facial image detected by the face detection module;
a search module configured to calculate a degree of similarity between the facial features extracted by the feature extraction module and the facial features contained in the database and output a search result based on the calculated degree of similarity;
a measuring module configured to measure an amount of the search result output by the search module;
a selection module configured to sort out the search result output by the search module if the amount of the search result measured by the measuring module is equal to or more than a preset threshold;

a display control module configured to generate a search result screen based on the search result sorted by the selection module; and an output module configured to output the search result screen generated by the display control module, wherein the selection module further is configured to calculate a priority based on the search result output from the search module and preset selection conditions, and to sort out the search result based on the calculated priority, wherein the preset selection conditions include one or a plurality of items and have scores set for each item and the selection module further is configured to calculate one or a plurality of scores based on the search result and the preset selection conditions, and to calculate the priority by integrating the calculated scores.

2. The facial image search system according to claim 1, wherein the items of the preset selection conditions include a location where the image data is acquired, a time when the image data is acquired, a degree of congestion of the location where the image data is acquired, and presence/absence of abnormal behavior when the image data is acquired and the selection module further is configured to calculate the score based on one or a plurality of each item of the preset selection conditions and an age, a sex, a human race, and presence/absence of a flag requiring attention in the search result.

3. The facial image search system according to claim 1, wherein the display control module further is configured to generate the search result screen in such a way that the search result screen is caused to display the search result in descending order or ascending order of the priority.

4. The facial image search system according to claim 3, wherein the display control module further is configured to calculate a display time during which the search result selected based on the priority is displayed in the search result screen and generates the search result screen in such a way that the search result screen is caused to display the search result in the calculated display time.

5. The facial image search system according to claim 3, further comprising:

an operation module configured to generate an operation signal based on an operation, wherein the display control module further is configured to generate the search result screen in such a way that the search result screen is caused to display the search result until a predetermined operation signal is received from the operation module.

6. The facial image search system according to claim 1, wherein the measuring module further is configured to measure the amount of the search result based on one or a plurality of a detection number of face per unit time, a number of search queries per unit time, a number of search results per unit time, a number of search results exceeding a predetermined threshold per unit time, a CPU load of devices in the facial image search system, an amount of used memory, and an amount of network traffic.

7. The facial image search system according to claim 1, further comprising:

a display module configured to receive the search result screen output from the output module and display the received search result screen.

8. The facial image search system according to claim 1, wherein the preset selection conditions are assigned to each of a plurality of cameras that transmit the image data to the image receiving module, the preset selection conditions include a location of the camera, a time when the camera acquired the image data, and a degree of congestion at a location where the camera acquired the image data, and the items set for the preset selection conditions assigned to the camera associated with the image data are used with the search result to calculate the scores.

9. A facial image search method used in a facial image search system including a storage module storing a plurality of facial features as a database, comprising:

receiving image data;

detecting a facial image from the received image data;

extracting facial features from the detected facial image;

calculating a degree of similarity between the extracted facial features and the facial features contained in the database and outputting a search result based on the calculated degree of similarity;

measuring an output amount of the search result;

sorting out the output search result if the amount of the measured search result is equal to or more than a preset threshold;

generating a search result screen based on the sorted search result; and outputting the generated search result screen, wherein the sorting step further includes calculating a priority based on the search result output from the calculating step and preset selection conditions, and sorting out the search result based on the calculated priority, wherein the preset selection conditions include one or a plurality of items and have scores set for each item and the sorting step calculates one or a plurality of scores based on the search result and the preset selection conditions, and calculates the priority by integrating the calculated scores.

10. The facial image search method according to claim 9, wherein the items of the preset selection conditions include a location where the image data is acquired, a time when the image data is acquired, a degree of congestion of the location where the image data is acquired, and presence/absence of abnormal behavior when the image data is acquired and the sorting step further calculates the score based on one or a plurality of each item of the preset selection conditions and an age, a sex, a human race, and presence/absence of a flag requiring attention in the search result.

11. The facial image search method according to claim 9, wherein the generating step generates the search result screen in such a way that the search result screen is caused to display the search result in descending order or ascending order of the priority.

12. The facial image search method according to claim 11, wherein the generating step calculates a display time during which the search result selected based on the priority is displayed in the search result screen and generates the search result screen in such a way that the search result screen is caused to display the search result in the calculated display time.

13. The facial image search method according to claim 11, further comprising:

generating an operation signal based on an operation, wherein the step of generating the search result screen generates the search result screen in such a way that the search result screen is caused to display the search result until a predetermined operation signal is received from the operation module.

14. The facial image search method according to claim 9, wherein the measuring step measures the amount of the search result based on one or a plurality of a detection number of face per unit time, a number of search queries per unit time, a number of search results per unit time, a number of search results exceeding a predetermined threshold per unit time, a CPU load of devices in the facial image search system, an amount of used memory, and an amount of network traffic.

15. The facial image search method according to claim 9, wherein
- the preset selection conditions are assigned to each of a plurality of cameras that transmit the image data to the image receiving module,
- the preset selection conditions include a location of the camera, a time when the camera acquired the image data, and a degree of congestion at a location where the camera acquired the image data, and
- the items set for the preset selection conditions assigned to the camera associated with the image data are used with the search result to calculate the scores.

* * * * *